W. H. TAYLOR.
METHOD FOR PRODUCING FLAT PARALLEL SIDED GLASS SHEETS.
APPLICATION FILED DEC. 5, 1918.
1,398,050.
Patented Nov. 22, 1921.
3 SHEETS—SHEET 1.
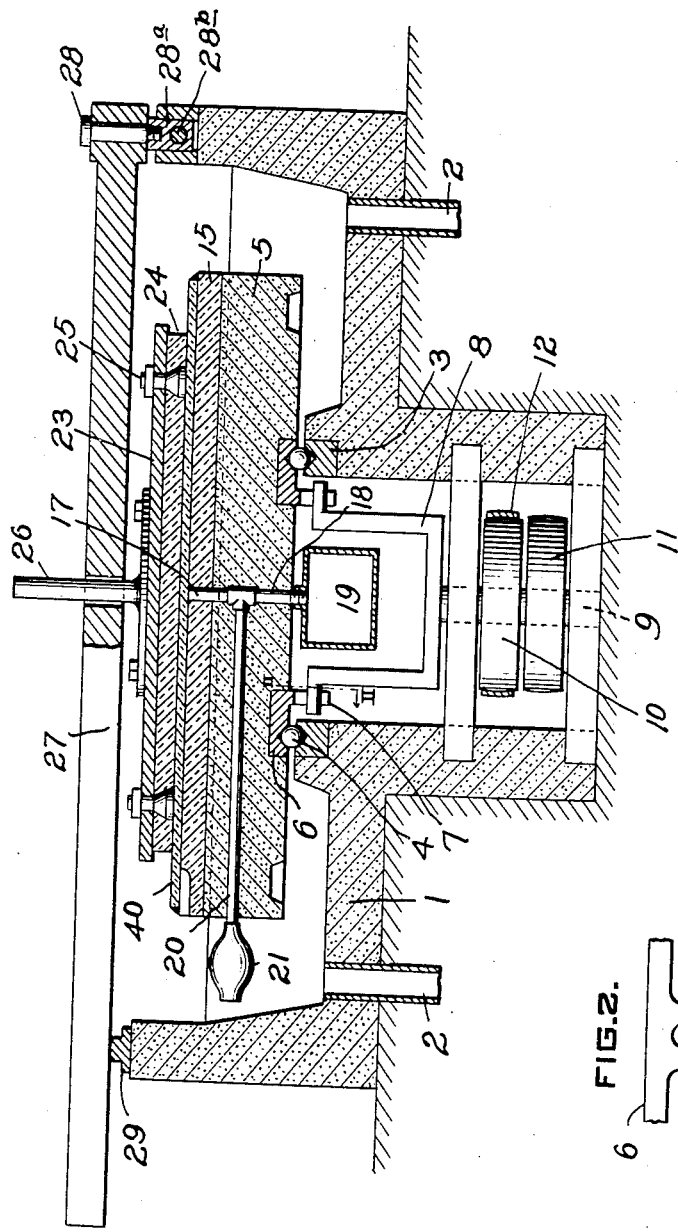
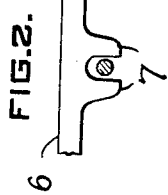
INVENTOR
William H. Taylor.
by
James C. Bradley,
atty.

W. H. TAYLOR.
METHOD FOR PRODUCING FLAT PARALLEL SIDED GLASS SHEETS.
APPLICATION FILED DEC. 5, 1918.
1,398,050.
Patented Nov. 22, 1921.
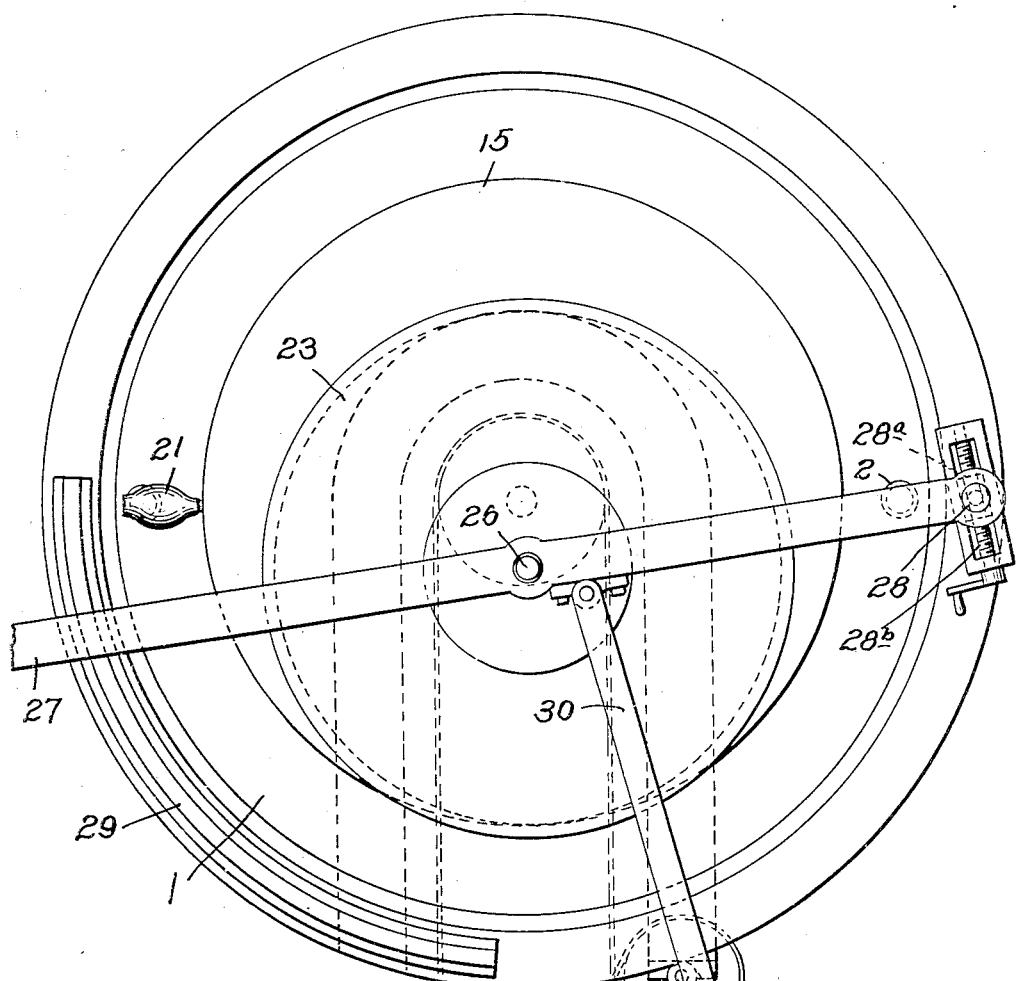
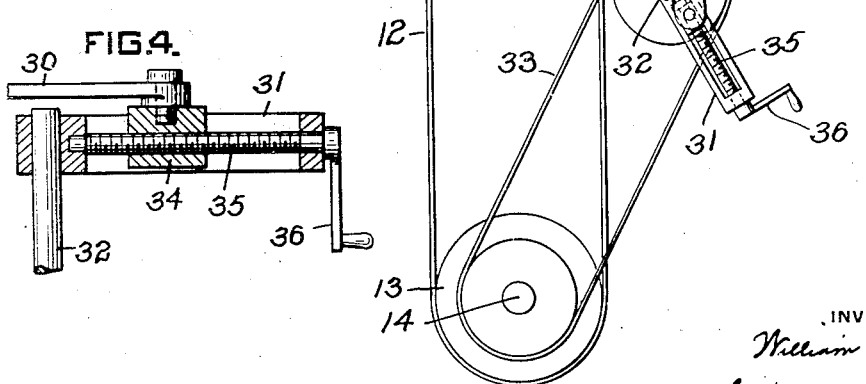
INVENTOR
William H. Taylor W. H. TAYLOR.
METHOD FOR PRODUCING FLAT PARALLEL SIDED GLASS SHEETS.
APPLICATION FILED DEC. 5, 1918.
1,398,050.
Patented Nov. 22, 1921.
3 SHEETS—SHEET 3.
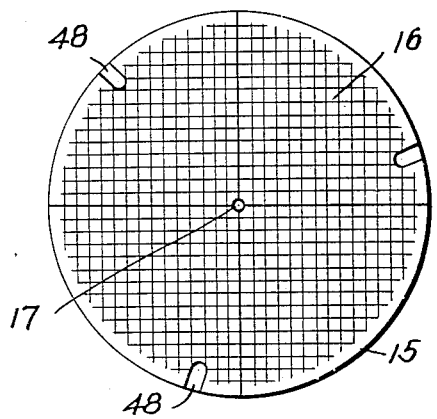
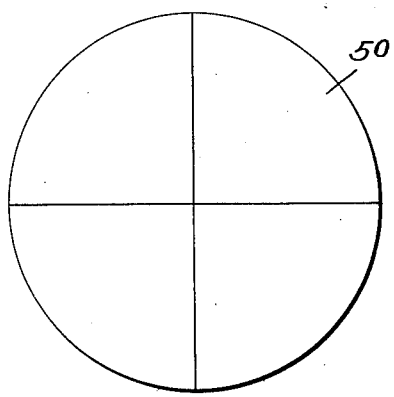
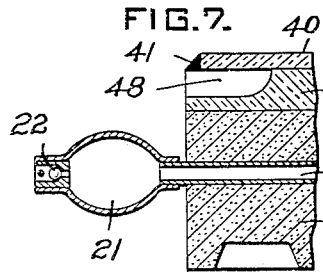
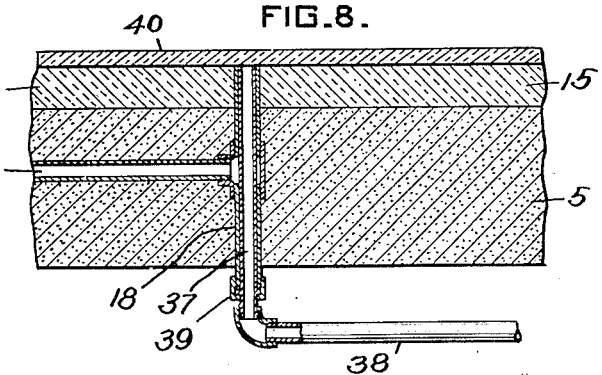
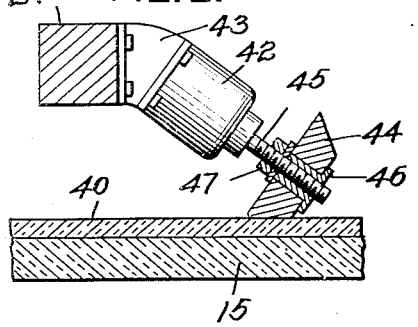
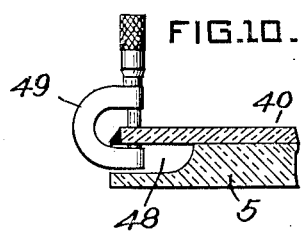
INVENTOR
William H. Taylor.
by
James C. Bradley.
Atty.

UNITED STATES PATENT OFFICE.

WILLIAM H. TAYLOR, OF CHARLEROI, PENNSYLVANIA, ASSIGNOR TO PITTSBURGH PLATE GLASS COMPANY, A CORPORATION OF PENNSYLVANIA.

METHOD FOR PRODUCING FLAT PARALLEL-SIDED GLASS SHEETS.

1,398,050.  Specification of Letters Patent.  Patented Nov. 22, 1921.

Application filed December 5, 1918. Serial No. 265,441.

*To all whom it may concern:*

Be it known that I, WILLIAM H. TAYLOR, a citizen of the United States, and a resident of Charleroi, in the county of Washington and State of Pennsylvania, have made a new and useful Invention in Methods for Producing Flat Parallel-Sided Glass Sheets, of which the following is a specification.

The invention relates to a method for producing flat parallel sided sheets of glass. These sheets are intended primarily for the production of the glass employed in sextant mirrors and such articles are particularly referred to hereinafter, but it will be understood that the glass produced may be used for other purposes requiring perfectly plane parallel surfaces. The glass employed in sextant mirrors must have absolutely plane parallel surfaces, and it is the particular purpose of this invention to provide a procedure and an apparatus whereby the surface of the glass can be produced with the greatest degree of accuracy and at a very low cost as compared with the methods heretofore employed. One embodiment of the apparatus for carrying out the process is illustrated in the accompanying drawing.

Figure 1, is a vertical section through the grinding mechanism employed, Fig. 2, is a detail section on the line II of Fig. 1, Fig. 3, is a plan view of the apparatus of Fig. 1, Fig. 4 is a detail section through the crank adjusting device. Fig. 5, is a plan view of the glass bed employed, Fig. 6 is a plan view of a divided sheet indicating diagrammatically an alternative method of procedure, Fig. 7 is a vertical sectional view on through the edge of the grinding table and through the air exhausting device, Fig. 8 is a vertical section through the center of the table showing the means for supplying plaster thereto, and Figs. 9 and 10 are sectional detail views illustrating two steps in the procedure.

The glass parts required when such plates are to be used in sextant mirrors are about ¼ inch in thickness and have an area of from one to two square inches. The process as herein further described contemplates producing a sheet about 60″ in diameter, which sheet is ground to the desired thickness and polished, and then cut into rectangular pieces of the desired size.

The apparatus preferably employed comprises a rotating table whose upper surface is preferably of glass and absolutely plane and true, such surface lying in the plane at right angles to the axis of rotation of the table. A runner or grinder is employed which is off center with respect to the axis of rotation of the table, such runner being mounted loosely so that it can follow the surface of the sheet to be ground and is supported in an oscillating arm so that its position can be changed with respect to the table.

Briefly stated the operation is as follows: The sheet or plate of glass is first secured to the table on a layer of plaster of Paris, a special procedure being followed as hereinafter set forth, to insure that the plate is uniformly and evenly supported upon the plaster, so that the glass is not under a strain tending to deform or bend it; the table is then rotated and the oscillation of the runner is so limited that a slightly concave surface is produced upon the sheet of glass. The range of oscillation of the runner is then increased, thus tending to produce a convex surface upon the sheet, and this operation is continued until the surface of the sheet is reduced from concave to flat form. The sheet is then released from the plaster, the bed cleaned, and the sheet inverted, the air between the sheet and bed being so exhausted, as hereinafter set forth, that atmospheric pressure is applied to every part of the sheet, tending to hold every part thereof flat upon the bed.

A motor grinder (later described) is now employed upon the upper side of the sheet to reduce it to a surface which is substantially at right angles to the axis of rotation of the table, or which at least renders the plate symmetrical in thickness about its center, after which the runner or grinder is positioned upon the sheet and the procedure heretofore described with respect to the smoothing of the first side of the sheet is repeated, the sheet being first ground somewhat concave and then gradually brought to a perfectly plane flat surface.

The apparatus employed will first be described, it being understood that other forms of apparatus may be used, although the one illustrated and described is preferred and is capable of producing the very accurate results required for this work. The table is preferably supported for rotation upon the concrete bed 1, provided with drainage passages 2 for carrying away the used abrasive and water. The metal ring 3, is mounted in the concrete and constitutes a race for the balls 4, upon which the table turns. The table preferably comprises a concrete bed 5, having embedded in its lower surface the metal ring 6, which acts as a ball race, in opposition to the ball race 3. The ring 6 is also provided on each side with a pair of depending lugs 7, Fig. 2, adapted to receive the upper ends of the yoke 8, which is designed to give the table movement of rotation. This yoke is provided with a shaft 9, mounted in suitable bearings and carrying the tight and loose pulleys 10 and 11. The pulley 10 is driven by the belt 12 from the pulley 13, such pulley 13 being mounted upon a suitable counter-shaft 14, driven from a source of power (not shown). The ends of the yoke 8 fit relatively loosely between the lugs 7, as indicated in Fig. 2, so that there is no tendency of the drive mechanism to disturb the position of the table upon its ball bearings, and as a result the table runs smoothly about a fixed axis of rotation, and without any tilting movement about such axis of rotation.

The body of the table 5 preferably comprises a relatively thick glass sheet 15, which is cast upon the table. The upper surface of this table is perfectly plane and flat, and lies in a plane which is perpendicular to the plane of rotation of the table. The method by which this surface is secured will be later explained. The upper surface of this glass bed is very lightly scored with a diamond as indicated by the lines 16, in Fig. 5, two of such lines intersecting at the center of the bed, at which point is an opening 17 which extends through the entire table. A pipe 18 (Fig. 1) extends from this opening and carries at its lower end a box 19. Also connected to the pipe 18, intermediate its end is a transversely extending pipe 20, carrying at its outer end an exhausting bulb 21, such bulb being shown in cross section in Fig. 7. This bulb is provided with a check valve 22, and it will be understood that any convenient form of exhausting device may be employed such as an atomizing bulb.

Maintained above the table is a runner or grinder, such runner preferably comprising the metal plate 23, having secured to its lower side the glass plate 24, held in position by means of countersunk bolts 24. On the runner is an upwardly extending shaft 26, loosely mounted in the supporting bar 27, so that the runner can adjust itself to the surface of the sheet being ground. The bar 27 is pivoted at one end upon the pin 28, and has its other end resting upon the quadrant 29, rigidly secured to the upper edge of the concrete base 1. Provision is made for oscillating the bar in the form of the connecting rod 30, connected at its outer end to the crank 31 (Fig. 3). This crank is mounted upon an upper end of the shaft 32, driven by means of the belt 33 from a pulley upon the countershaft 14. The throw of the crank is adjusted by means of the block 34 (Fig. 4), mounted upon the screw 35, such screw being provided at its outer end with the handle 36. The pivot 28 of the bar 27 is also mounted in a block 28$^A$, similar to the block 34 and similarly adjustable laterally by a screw 28$^B$ corresponding to the screw 35.

The method employed will now be described. The sheet of glass which may, if desired, have been partially ground by the usual methods, and which is perhaps $\frac{1}{16}$ of an inch thicker than the sheet which it is desired to use, is placed upon the bed 15, the runner and the supporting bar being at such time out of position. The pipe 37 (Fig. 8) is then inserted through the center of the pipe 18 for the application of the plaster, the box 19 being, of course, removed at such time. The pipe 37 is connected to a laterally extending supply pipe 38, and is held in position upon the pipe 18 by means of the coupling 39. A supply of plaster is then forced through the pipes 37 and 38 to the under side of the sheet 40 upon the table, this supply of plaster being continued under hydraulic pressure until the plaster spreads to the edge of the sheet. The tendency in thus applying the plaster is to create a thicker layer of plaster at the center of the sheet, and this tendency must be counteracted by working the sheet about upon the plaster until a layer of plaster of substantially uniform thickness is secured. The application of plaster in this way serves to give a layer of very uniform thickness, and after the sheet of glass has been properly manipulated and worked about upon the plaster, a condition is secured in which there is no strain imposed upon the glass incident to any non-uniform support, such as would be the case if the sheet were supported by a bed of plaster applied in the usual way and having a varying thickness and density. It follows, therefore, that there is no deformation or bending of the glass due to an unequal support, and as a result, after the sheet has been ground so that its upper surface is a true plane, there is no departure from this true plane after the sheet is released from the plaster. It is a necessary feature of my process, as will later appear, that after the first side of the sheet has been made perfectly true, it shall remain true during the grinding of the second side and after the sheet is released from the machine. Any desired means may be employed for forcing the mixture of water and plaster through the pipe 38, but the simplest form is an upright tube of such height as to give the necessary pressure by gravity.

The sheet having been properly secured upon the bed 15, so that there is no strain upon the sheet or deformation thereof, the runner is positioned as indicated in Fig. 3, and the pipes 37 and 38, for supplying the plaster, are removed. The rotation of table 5 causes a rotation of the runner since the runner is eccentric with respect to the table, and at the same time the runner is caused to oscillate in and out by reason of its connection with the crank 31. At this time, the throw of the crank is so adjusted that the runner in its innermost position has its center adjacent that of the table, while in its outer position its periphery is about tangent with the periphery of the sheet being ground. The range of this movement is dependent upon the conditions and may be varied during the initial grinding operation, but the range of oscillation in any case is such that the sheet 40, is ground slightly concave, the lower side of the grinder being ground correspondingly convex. After this condition is arrived at, the throw of the crank is increased so that on the outward movement of the runner it overhangs the edge of the sheet 40. As a result, a greater grinding effect is secured upon the outer portions of the sheet, thus tending to produce convexity upon the surface of the sheet. The tendency, therefore, at this time, is to reduce the sheet from its concave form to a convex form, the intent being to terminate the grinding when the sheet reaches an intermediate stage where it is neither concave nor convex, but is a true plane. This result can be achieved only by the most careful manipulation of the throw of the crank governing the oscillation of the runner and by repeated tests of the surface of the glass to determine its condition of curvature as the grinding progresses. It is difficult to specify the range of adjustment of the crank and the time of grinding for the various adjustments, as these are matters which very widely depend upon conditions and must be governed and determined largely by the skill of the operator. As a suitable example indicating the conditions in a general way, my machine contemplates grinding a sheet of glass five feet in diameter with a runner four feet in diameter, the range of oscillation being such that on its inward oscillation the center of the runner will come over that of the table, or pass such center only an inch or two, and in its outer position such center will be fourteen inches from the center of the table. During the concaving of the sheet, the length of the oscillation will approximate a maximum of six inches, while in the corresponding operation tending to convex the sheet, the maximum extent of oscillation will be fourteen inches. The center of oscillation will also be varied during the grinding by adjusting the position of the pin 28 back and forth.

The flatness of the sheet is preferably determined from time to time by means of a straight edge, which may be made of plate glass used in connection with two strips or blocks of glass of known thickness and a graduated wedge. The ends of the straight edge rest upon blocks of known thickness, and the extent of deviation of the surface intermediate the blocks can be determined by the wedge. As the sheet approaches more and more nearly to a plane, frequency and accuracy of the tests with the straight edge must be increased. Other means may, of course, be employed for determining the flatness of the sheet, but the one just described is believed to be the one most effective for this particular work. I have found that it is possible, by the foregoing method, to produce a plane surface of great exactness, the difficulty of accomplishing this result being much less than if an attempt is made to secure the desired result by grinding directly to a flat surface. The greater ease in securing the plane surface by this method is probably due to the fact that the condition of the glass is uniform and definitely known at all times, as well as the character of the curvature which the method of grinding tends to produce.

The foregoing produces a sheet which is a true plane upon one side, thus bringing the procedure to the second and more involved operation of reducing the second side of the sheet not only to a true plane, but to one which is in parallelism with the plane of the first side. The runner having been removed, the sheet of glass is released from the bed, the bed cleaned and the glass inverted upon such bed. In this connection, it will, of course, be understood that the procedure may be carried out by the use of two machines, one of which does all the grinding on the one side and the other all the grinding on the other side, and the process is not limited to this practice upon the single machine, but the cost of equipment is, of course, less with the single machine, and the operation, while somewhat slower, is in all its essentials substantially the same. The sheet being now inverted upon the table, sealing wax 41 (Fig. 7) is applied around the edge of the sheet. This sealing wax is preferably of such character that it will maintain its stickiness during the grinding operation and not peel or chip off. A suitable wax may be made from rosin and turpentine. The box 19, is now applied (Fig. 1,) and the air is exhausted by means of the bulb 21. The box 19 serves to increase the volume from which exhaust occurs, so that in case of a slight leakage, a partial vacuum may be longer maintained than would otherwise be the case. The plurality of the lines 16 (Fig. 5) scored upon the face of the bed permits of an exhaust throughout the entire area intermediate the bed and the glass sheet. This insures an air pressure upon each section of the area of the sheet, so that it is held flat and tight throughout such area. If it were not for these lines or their equivalent, the exhaust would occur from only a limited area at the center of the sheet, and while this would hold the sheet against the bed with great force, a rotation of the sheet about its central portion might occur during the grinding, and what is most important, the balance of the body of the sheet would not be pressed down tightly against the bed, so that the lower face would not be maintained in a true plane during the grinding. The lines are preferably made about two inches apart and are very light, as otherwise there would be a tendency of the glass to bend in or deform opposite the lines. The surface of the bed is also slightly smoothed or polished after the scoring in order to take away any sharp edges due to the scoring. I regard this feature of the procedure involving the maintaining of the sheet under pressure throughout its area, as very important, and as a feature which has contributed in a large measure to the success of the operation. If the leakage in the system causes a sufficient loss of vacuum, the expanding of the bulb 21 will indicate this and a further exhaust can be accomplished at any time. However, with the use of the box 19 and with the proper sealing at the edge of the sheet, this should not occur during the grinding process.

The next step in the operation is the reduction of the upper surface of the glass so that it lies in a plane which is substantially parallel to the lower side, or which is substantially symmetrical in thickness about its center. This is done before reducing the surface to a true plane by the method heretofore described, since this insures that the two sides of the sheet will be substantially parallel after the second side is reduced to a true plane. This preliminary reduction of the upper surface of the plane may be accomplished by means of the motor grinder illustrated in Fig. 9. This motor grinder is secured to the bar 27, the runner being at such time removed. The device comprises the motor 42 secured in position by the brackets 43 and the grinder 44. This grinder may be of carborundum or any desired material and is provided with a collar 46 threaded upon shaft 45 of the motor. In operation the grinder table is rotated and the bar 27 is moved outward from the center of the sheet by hand, thus machining or grinding the glass sheet from its center to its outer edge and producing a surface which is substantially symmetrical in thickness about the center of the sheet, although such surface is not a perfectly true plane.

The reduction to a true plane constitutes the next step of the operation, and this is accomplished by means of a runner as described in connection with the grinding of the first side of the sheet, the sheet first being ground slightly concave, and the swing of the runner then being increased so as to tend to grind a convex surface on the sheet, the operation being stopped when the surface is at a mean between concave and convex, that is when it is a plane. During this grinding the edge of the sheet is calipered from time to time to gage its thickness, this being accomplished by providing recesses 48 in the edge of the bed 15, as indicated in Figs. 5 and 10, such recesses giving an opportunity for the insertion of a pair of calipers 49 (Fig. 10). If it is found that any section of the sheet is thicker than it should be, a special grinding expedient which may be termed "local grinding," is adopted. This expedient consists in stopping the rotation of the table with the thick portion of the sheet on the side of the table toward the crank 31, and allowing the crank to move the runner back and forth while the table is thus stopped. This, of course, tends to grind down the portion of the sheet which is thickest, and after a partial reduction of this excess thickness is secured, the table is again started, the operation being repeated until a uniform thickness is secured. The grinding of the second side of the sheet by the motor grinder so that its thickness about its center is symmetrical, taken in conjunction with the step of keeping the thickness uniform during the grinding with the runner, as above described, insures that the upper surface of the glass will be parallel to the lower side previously ground, and when such upper surface is made a true plane by the runner, a sheet of glass is secured having parallel surfaces which are true planes.

Throughout the grinding operation the necessary abrasive can be applied in any desired manner, although preferably this is done in a manner well known in the art, which consists in providing a number of perforations through the runner or grinder, in which are maintained funnels through which the abrasive and water is applied. This being a feature well known in the art, constituting no part of the present invention, is not illustrated. After the grinding operation a sheet may be polished by any desired method, this being done on the same table as the grinding, or if desired, on a separate table, and the sheet being held down tight upon the table by the expedient of exhausting the air beneath it as heretofore described. As before stated, the grinding of the two sides of the sheet may be accomplished on two different tables although preferably this is done on one table. After the sheet has been polished it is cut up into sections of the desired size, depending upon the use to which the sections are to be applied.

Fig. 6 indicates a modified procedure for securing uniform thickness of glass during the grinding of the second side. With this method of procedure, the glass sheet is cut into the four sections 50, and from time to time, during the grinding by the runner, these sections are interchanged in position. By making a sufficient number of changes during this grinding operation, the sheet is finally reduced to uniform thickness throughout, so that the use of the motor grinder may be dispensed with. The desired result may be secured most rapidly by calipering the sheet from time to time and interchanging those sections of the sheet which have the greatest difference in thickness. This method of procedure, however, is not preferable because of the requirement for cutting the sheet in sections and because it cannot be carried out as rapidly as the procedure heretofore described.

As indicated in the beginning, the upper surface of the glass bed 15, must be made perfectly plane and perpendicular to the axis of rotation of the table. This is accomplished preferably by the method heretofore described for grinding the second side of the sheet of glass. That is the motor grinder is first employed to make the surface of the sheet symmetrical about its center, although not necessarily a true plane, and subsequently the runner is employed as a grinder, first reducing the surface of the bed to concave form and then gradually reducing the curvature to a plane. I regard the use of glass for the composition of the bed 15 and grinder 44 as preferable, but it may be feasible to use metal for these parts instead of glass.

If desired, the use of the motor grinder may also be dispensed with, without cutting the sheet into the sections of Fig. 6, although this operation without the motor grinder is somewhat slower. In the practice of this modification of the process, the "local grinding" heretofore referred to is entirely relied upon to bring the sheet to uniform thickness so that the two sides are parallel. This "local grinding" occurs to bring the sheet to uniform thickness before the surface is brought to a true plane, and with the coarser abrasive, so that the final operation with the finest abrasive consists in bringing the surface of the sheet to a true plane, as heretofore described. The side or portion of the sheet which is thicker is determined by the use of the calipers and the excess thickness is reduced in stages, the rotation of the sheet being stopped from time to time and the runner worked back and forth so that a portion of the excess thickness is taken care of at each period of rest of the table.

When a table of concrete is employed with a relatively thick glass bed 5 thereon, as illustrated, it is desirable to maintain the room in which the grinding occurs at a temperature approximating that of the table when the glass bed is cast; otherwise the unequal contraction of the glass and concrete is liable to cause warping of the glass and breakage. If the glass bed is made relatively thin, this trouble is not so liable to occur. The difficulty may also be avoided by building the table up of laminated sheets of glass or some other substance having a coefficient more nearly the same as that of glass.

What I claim is:

1. The process of securing a plate of glass to a flat bed which consists in applying the plate to the bed, forcing a mixture of plaster and liquid between the plate and the bed, and allowing the plaster to set.

2. The process of securing a plate of glass to a flat bed which consists in applying the plate to the bed, forcing a mixture of plaster and liquid through the bed and between the plate and the bed, and allowing the plaster to set.

3. The process of securing a plate of glass to a flat bed which consists in applying the plate to the bed, forcing a mixture of plaster and liquid at the center thereof and between the plate and the bed, and allowing the plaster to set.

4. The process of securing a plate of glass to a bed which consists in applying the plate to the bed, forcing a mixture of plaster and liquid through the bed into the space between the plate and bed at a single point substantially central of the plate, and then working the plate around upon the mixture until any deformation of the plate due to an improper distribution of the mixture is removed.

5. The process of producing a sheet of glass having opposing parallel plane surfaces which consists in seating the plate in plaster upon a rotatable bed having a plane surface at right angles to the axis of rotation of the table in such manner that the glass is supported uniformly throughout and without deformation, imposing upon the table a glass grinder having its center off center with respect to that of the table, grinding the surface of the sheet plane with such grinder, removing the plate and the plaster from the table, inverting the plate upon the surface of the table with its surface in contact therewith throughout the area of the plate, rarefying the air between the sheet and table, and grinding the upper surface of the plate with said grinder.

6. The process of producing a sheet of glass having opposing parallel plane surfaces, which consist in seating the plate in plaster upon a rotatable bed in such manner that the glass is supported uniformly and without deformation, grinding the surface of the glass into a plane, removing the glass sheet and inverting it upon a rotatable bed with its surface throughout in contact with the surface of such bed, such surface being a plane surface lying at right angles to the axis of rotation of the bed, rarefying the air between the sheet and the bed and grinding the glass so that its surface is perpendicular to the plane of rotation of the table, and substantially plane.

In testimony whereof I have hereunto subscribed my name this 29th day of November, 1918.

WM. H. TAYLOR.

Witness:
MINNIE B. RICHARDSON.